United States Patent
Bauer et al.

(10) Patent No.: US 6,656,861 B1
(45) Date of Patent: *Dec. 2, 2003

(54) GLASS COMPOSITION FOR ULTRAFINE FIBER FORMATION

(75) Inventors: Jon Frederick Bauer, Castle Rock, CO (US); Foster Laverne Harding, Castle Rock, CO (US); Harry Hand Russell, III, Evergreen, CO (US)

(73) Assignee: Johns Manville International, Inc., Denver, CO (US)

( * ) Notice: Subject to any disclaimer, the term of this patent is extended or adjusted under 35 U.S.C. 154(b) by 93 days.

This patent is subject to a terminal disclaimer.

(21) Appl. No.: 09/703,833

(22) Filed: Nov. 2, 2000

Related U.S. Application Data

(60) Provisional application No. 60/163,479, filed on Nov. 3, 1999.

(51) Int. Cl.[7] .......................... C03C 3/093; C03C 3/091; C03C 13/00; B01D 39/06

(52) U.S. Cl. .............................. 501/67; 501/66; 501/35; 55/527

(58) Field of Search .............................. 55/527; 501/35, 501/65, 66, 69, 67, 72, 36

(56) References Cited

U.S. PATENT DOCUMENTS

| | | | |
|---|---|---|---|
| 5,401,693 A | | 3/1995 | Bauer et al. |
| 5,523,265 A | * | 6/1996 | Rapp et al. .................... 501/35 |
| 5,945,360 A | | 8/1999 | Harding et al. |

* cited by examiner

*Primary Examiner*—David Sample
*Assistant Examiner*—Elizabeth Bolden
(74) *Attorney, Agent, or Firm*—Burns, Doane, Swecker & Mathis, L.L.P.

(57) ABSTRACT

Provided are glass compositions uniquely applicable for the preparation of ultrafine fibers for filtration and separation applications. The glasses meet all physical and chemical criteria, including that for biodissolution rate.

31 Claims, No Drawings

GLASS COMPOSITION FOR ULTRAFINE FIBER FORMATION

CROSS REFERENCE TO RELATED APPLICATIONS

The present invention claims priority to provisional application No. 60/163,479, filed on Nov. 3, 1999, which is incorporated by reference herein in its entirety.

BACKGROUND OF THE INVENTION

1. Field of the Invention

The present invention relates to glass compositions which are uniquely applicable to the preparation of ultrafine fibers for filtration and separation applications. Fiber made from the glasses disclosed exhibit the necessary properties of moisture resistance, chemical resistance and strength, as well as excellent biosolubility.

2. Description of the Related Art

Glass forming compositions suitable for fiberization are typically restricted by their melt and end properties to conform to process specifications and product performance criteria. For example, in both rotary and flame attenuation processes, only certain values for high temperature viscosity (T at $10^3$ poise) and liquidus are acceptable. Moreover, such compositions must demonstrate adequate physical properties such as tensile strength and moisture resistance when formed into fibers by these processes. In addition, more recently, it has become increasingly more important that these fibers degrade at sufficiently high rates in the body, such that they pose little to no potential risk to humans if inhaled and can at least be demonstrated to have limited biological effects to laboratory animals when tested.

A good glass fiber forming composition should also have good "runability"—the ability to be easily fiberized into long fibers of small diameter with good production rates and little or no shot. While there are many factors involved in this, not all of which have been clearly identified, it is believed that surface tension and lack of tendency for the melt to phase separate play key roles. In specific, it is desirable for a glass composition to have as low a surface tension as possible at fiberization temperatures (keeping in mind the other factors above), such that the work done in forming a unit area of surface is kept to a minimum.

All of these factors are especially important in the production of ultrafine fibers used to produce specialty papers and other media for air and liquid filtration applications. For example, fine diameter fiberglass products intended for end-use service as HEPA clean-room filters have been known for many years, e.g., the fiberglass products marketed by Johns Manville International Inc. under the trademark MICROFIBER. These HEPA clean-room filters are used by the medical, pharmaceutical, and microelectronics industry in settings where ultra-pure air is required. Such applications place some significant demands on the glass in terms of both fiberization and end properties. Specific requirements can be as follows.

The glass must be capable of being melted and fiberized at temperatures low enough for the capability of the equipment and to attain reasonable (economic) production rates. This requires that the HTV value of the glass (temperature when the melt viscosity is 1000 poise) be less than 2025° F. (1107° C.) and the surface tension of the glass at 1642° F. (900° C.) be less than 315 dynes/cm.

The glass must not crystallize or devitrify in the melters, pots, bushings or anywhere in the system used to melt, contain, transport, or fiberize the glass. Crystallization impairs flow of melt to fiberization orifices. To prevent devitrification the liquidus temperature of the glass must preferably be at least 350° F. (194° C.) below the HTV.

The glass must not corrode or have adverse reactions with metal parts or refractories used to contain the melt or the newly-forming fiber. Also, the glass must be capable of being drawn into ultrafine diameters (as low as 0.2 $\mu$m) without breakage into short lengths.

The glass must not produce excessive volatilization during melting or fiberizing. Volatilization leads to compositional variations, increased corrosion of refractories, increased emissions, and, when volatiles condense, to unacceptable dust levels in the product.

The glass must provide strength to the fiber—suitable to form fibers capable of being wet or dry (air) processed into papers or felts and meet all of the requirements (tensile, elongation) required for the paper product. Because of its high specific surface area, the glass must also have sufficient chemical durability, particularly with regard to ambient atmospheric moisture, so that little to no deterioration in fiber strength occurs with time during packaging, shipping, and storage prior to use in a papermaking process. Loss in fiber strength correlates with increase in fiber surface area as measured by BET methods (using krypton). After exposure of fibers to 122° F. (50° C.) for 72 hours, the change in surface area should be less than 10%. Glass must also be sufficiently durable and resistant to moisture attack after contact with whitewaters or other media used in the papermaking process, so that little to no deterioration occurs with time after the fiber is in a paper product.

Because the fiber is of very fine diameter and capable of being respired, it must also degrade in the body at a rate that is sufficiently rapid so as not to induce respiratory diseases, especially chronic diseases such as emphysema or cancer. Measured in vitro dissolution rates for the fiber in simulated physiological saline ($k_{dis}$) must be greater than 100 ng/cm$^2$ hr. Such biosolubility performance is difficult to achieve when balancing biodissolution against properties such as sufficient strength for ultrafine fibers. It is particularly difficult to achieve with regard to flame attenuated fibers.

In preparing flame attenuated fibers, the glass fibers are exposed to temperatures much higher than in a rotary process. The higher temperatures cause a loss of the more volatile compounds of the glass composition from the outside of the fibers, resulting in a "shell" which has a different composition than the fiber interior. As a result, the biosolubility of glass fibers prepared from pot and marble or other flame attenuated fiberglass is not the same as that derived from the rotary process. As glass fibers must necessarily dissolve from the fiber ends or the cylindrical exterior, a more highly resistant shell will dramatically impede the dissolution rate. Fibers having such a shell, which are flame attenuated, are also prepared by the rod method or direct melt method. These latter methods involve conveying raw materials, in any form, to an orifice or bushing to form primaries, which are then flame attenuated, as in a pot and marble method. While flame attenuated fibers exhibit excellent chemical and moisture resistance due to this core/sheath structure, biosolubility of the fibers can be a problem.

Glass fibers must also be leachable in paper making media such as acid whitewaters such that hydrolytic bonds can form between leached fiber surfaces when the paper is dried. Such bonds provide strength and a structural integrity in the final product. However, too great a leach rate can leave the fiber with a porous surface structure which is too susceptible to moisture attack after the paper is formed. For a one hour residence in simulated whitewater (H2SO4 pH 2.5) at 77° F. (25° C.), total leach rates should be at least 0.2 µg/cm² hr, but less than 0.7 µg/cm² hr.

Glass fibers must also show good performance in handsheets, both in initial tensile strength and in loss in tensile strength over time. This is evaluated by determining load to failure at a gauge length of 4" (10.2 cm) of mechanically formed handsheets. For handsheets made of fiber with a 1 µm mean diameter, initial tensile strengths should be at least 1.8 lbs. with no statistically significant loss in tensile strength after aging at 95° F. (35° C.) and 95% relative humidity for up to 168 hrs.

The glass fibers must also show good performance in doubly folded handsheets, both in initial tensile strength and in loss in tensile strength over time. This is evaluated by determining load to failure at a gauge length of 4" (10.2 cm) for the handsheets whose properties are defined above. For handsheets made of fiber with a 1 µm mean diameter, initial folded tensile strengths should be at least 0.7 lbs. Tensile strength after aging at 95° F. (35° C.) and 95% relative humidity for up to 168 hrs should show an exponential decay with a t ½ of no less than 250 days. The glass fibers must also show good performance in mat elongation, both as measured in direct and folded tensile tests as described above. Elongation measures the integrity of the fiber to fiber bond and can be related to both manufacturability of the paper and its performance in product (e.g., pleating, etc.). For handsheets made of fiber with a 1 µm mean diameter and basis weight as defined above, elongation in either test should be less than 1% at failure. Change in elongation upon aging under the conditions above should be less than 30%.

The achievement of producing ultrafine glass fibers with the requisite strength, chemical and moisture resistance, while also exhibiting acceptable biosolubility is quite challenging. The industry would find such fiberglass quite useful. Accordingly, glass compositions suitable for efficiently making ultrafine fibers for use in specialty papers and particularly in media for air and liquid filtration applications, where the requested biosolubility and strength performance are realized, are greatly desired.

SUMMARY OF THE INVENTION

The glass compositions of the present invention are uniquely applicable for the preparation of ultrafine fibers for filtration and separation applications. The glasses of the present invention meet all physical and chemical criteria including that for dissolution rate. The compositional range in which glass fibers meeting these criteria can be formed (expressed in mole percent of the glass composition) is as follows:

| | |
|---|---|
| $SiO_2$ | 62 to 68 |
| $ZrO_2$ | 0 to 3 |
| $Al_2O_3$ | 0.1 to 2 |
| $B_2O_3$ | 7 to 12 |
| CaO | 1.5 to 35 |
| MgO | 0 to 3.5 |
| BaO | 0 to 3 |
| ZnO | 2 to 5 |
| $Na_2O$ | 8 to 14 |
| $K_2O$ | 0 to 3.5 |
| $F_2$ | 0 to 1.5 |

The glass compositions of the present invention are particularly adapted to provide glass fiber media which is useful for fabrication HEPA air filtration systems for cleanroom installations. Glass HEPA media are made from a blend of fine diameter glass fibers ranging from 0.2 to 2 micron. These products are rated for high filtration efficiency values while maintaining reasonably low pressure-drop characteristics.

The glass composition and fibers of the present invention exhibit stability in wet acidic environments and resistance to moisture attack during storage under humid ambient conditions, which are two important properties of glass fibers used in HEPA filtration applications. In addition, the glass of the present invention have viscosity and liquidus temperature properties that are compatible with fiberglass manufacturing technologies used to produce fine diameter fibers, particularly flame attenuation processes. The glass compositions and fibers of the present invention also exhibit excellent biosolubility such that the fibers degrade at a high rate in the body if inhaled, which is a property that is becoming increasingly more important.

Among other factors, it has been found that the glass compositions of the present invention can be used to prepare glass fibers, by any method, including flame attenuation or rotary, which exhibit the necessary chemical and strength properties, as well as processing characteristics, to allow for the efficient preparation of the fibers for use in paper and filtration products. Particular application is found for ultrafine fibers in filter products. Moreover, the glass compositions permit such chemical and strength characteristics while also offering good biosolubility. It is through a balance of the components of the glass composition that such a balance of properties is possible, which balance is reflected in the compositions of the present invention.

DETAILED DESCRIPTION OF THE PREFERRED EMBODIMENTS

The glass compositions of the present invention from which glass fibers, particularly ultrafine glass fibers, can be prepared exhibiting the requisite strength, chemical and moisture resistance, and biosolubility, is as follows, expressed in terms of mole percent of the glass composition:

| | |
|---|---|
| $SiO_2$ | 62 to 68 |
| $ZrO_2$ | 0 to 3 |
| $Al_2O_3$ | 0.1 to 2 |
| $B_2O_3$ | 7 to 12 |
| CaO | 1.5 to 3.5 |
| MgO | 0 to 3.5 |
| BaO | 0 to 3 |
| ZnO | 2 to 5 |
| $Na_2O$ | 8 to 14 |
| $K_2O$ | 0 to 3.5 |
| $F_2$ | 0 to 15 |

The foregoing compositions offer an excellent balance in properties when used to prepare glass fibers. Among the most important components to control in the composition is the $Al_2O_3$ and ZnO. The $Al_2O_3$ content is generally from 0.1 to 2 mole %, which allows for good biosolubility and sufficient chemical resistance and tensile strength to be able to make ultrafine diameter glass fibers, e.g., a diameter <2 µm, more preferably less than 1 µm. The presence of ZnO in the range of from 2 to 5 mole % also has been found to permit good moisture resistance without comprising biosolubility. A small amount of $ZrO_2$ is also preferred to be present in the glass compositions of the present invention, although not required. The amount of CaO and MgO is also kept quite low in the compositions of the present invention, with the combined amount being less than 7%, and preferably less than 5%. Keeping the Ca and Mg low offers a low liquidus temperature.

In a preferred embodiment, the glass composition and fibers prepared therefrom comprise in mole %

| | |
|---|---|
| $SiO_2$ | 64 to 66 |
| $ZrO_2$ | 0 to 2 |
| $Al_2O_3$ | 0.4 to 1.5 |
| $B_2O_3$ | 10 to 12 |
| CaO | 1.5 to 2.5 |
| MgO | 0.5 to 2.5 |
| BaO | 2.0 to 2.5 |
| ZnO | 3.0 to 4.5 |
| $Na_2O$ | 9 to 13 |
| $K_2O$ | 0.1 to 3.0 |
| $F_2$ | 0 to 1.5 |

The procedure used to evaluate biodissolution rate is similar to that described in Law et al. (1990). The procedure consists essentially of leaching a 0.5 gram aliquant of the candidate fibers in a synthetic physiological fluid, known as Gamble's fluid, or synthetic extracellular fluid (SEF) at a temperature of 37° C. and at a rate adjusted to achieve a ratio of flow rate to fiber surface area of 0.02 cm/hr to 0.04 cm/hr for a period of up to 1,000 hours duration. Fibers are held in a thin layer between 0.2 $\mu$m polycarbonate filter media backed by plastic support mesh and the entire assembly placed within a polycarbonate sample cell through which the fluid may be percolated. Fluid pH is regulated to 7.4±0.1 through the use of positive pressure of 5% $CO_2$/95% $N_2$ throughout the flow system.

Elemental analysis using inductively coupled plasma spectroscopy (ICP) of fluid samples taken at specific time intervals are used to calculate the total mass of glass dissolved. From this data, an overall rate constant could be calculated for each fiber type from the relation:

$$k=[d_o\rho(1-(M/M_o)^{0.5})]/2t$$

where k is the dissolution rate constant in SEF, $d_o$ the initial fiber diameter, $\rho$ the initial density of the glass comprising the fiber, $M_o$ the initial mass of the fibers, M the final mass of the fibers ($M/M_o$=the mass fraction remaining), and t the time over which the data was taken. Details of the derivation of this relation is given in Leineweber (1982) and Potter and Mattson (1991). Values for k may be reported in ng/cm²/hr and preferably exceed a value of 100. Replicate runs on several fibers in a given sample set show that k values are consistent to within 3 percent for a given composition.

Data obtained from this evaluation can be effectively correlated within the sample set chosen—dissolution data used to derive k's were obtained under identical conditions of initial sample surface area per volume of fluid per unit time, and sample permeability. Data was obtained from runs of up to 30 days to obtain an accurate representation of the long term dissolution of the fibers. Preferred biodissolution rate constants in ng/cm²/hr are greater than 100 ng/cm²/hr, and more preferably greater than 110 ng/cm²/hr, most preferably greater than 130 ng/cm²/hr.

The glass fibers of the present invention can thereby offer one the benefits of a core/sheath structure fiber in terms of moisture resistance, while also enjoying good biodissolution, when the glass fibers of the present invention are prepared by a process involving flame attenuation, such as the rod method, direct melt method or pot and marble method, with application to the pot and marble method being most preferred. As mentioned previously, the primaries in a flame attenuation process are exposed to higher temperatures than in a rotary or continuous filament process. The primaries are contacted with a sufficiently high temperature to create a shell due to the loss of the more volatile compounds of the glass composition from the outside of the fibers. The resulting fiber has an outside shell which has a different composition than the fiber interior.

The primaries are typically drawn from a multitude of orifices by sets of pull rolls or other relatively slow speed drawing devices that both draw the primaries in a controlled way and also feed the primaries into the flame attenuation zone. Synchronized pairs or sets of rollers are used to draw all primaries at the same speed.

The primaries are drawn through orifices that can be arranged in either a circular array or a rectangular one. The circular array generally occurs in the bottom of a super alloy cylindrical pot, which is used to remelt previously melted glass in marble form. This variation, known as pot and marble, has the cylindrical pot, with rings of orifices in the bottom and an external combustion chamber around the sides of the pot. Marbles at ambient temperature are fed into the pot and are heated using radiant heat from the exterior combustion chamber. The marbles fuse and form a molten pool above the orifices from which the primaries are drawn.

Orifices may also be arranged in rows in the bottom of bushings, which typically are rectangular solid reservoir designs of electrically heated precious metal or super alloy construction. The bushings may be designed to remelt glass in marble or other geometric forms, much as is done in the pot and marble process described above. Alternately, the bushings may be fed with molten glass from small glass melting units which were fed with batch, which is a mixture of the appropriate raw materials for the glass composition desired. The batch is fused in the melting units by the application of either electrical energy or fossil fuel fire burners. After melting and refining, the molten glass bath's temperature is cooled in a controlled way in order to supply the bushings with glass at the appropriate temperature.

While preparation of the glass fibers of the present invention by flame attenuation is preferred, the glass fibers can be prepared by any conventional method, including the rotary process. The process for preparing the glass fibers will be dictated by the ultimate application or product in which the fiber is to be used. Some variations within the ranges of the compositions may also be necessary to optimize the glass for a particular application.

The applications for which the ultrafine fibers are suitable include many specialty paper and separation filters. The fibers of the present invention are not only suitable for flame attenuation or rotary processing into fine glass fibers, but the fibers made from the compositions of the present invention are also appropriately resistant to acid white water attack and the resulting specialty fiberglass papers exhibit sufficient humidity resistance to withstand handling and pleating into HEPA filters.

The specialty paper making process used to manufacture HEPA media involves dispersing the glass fibers in an acidic suspension referred to as "white water" by paper makers. As previously described, glass fibers suitable for HEPA filters must have properties which allow them to function adequately in this environment. A simulation for the entire paper-making process is based upon making "handsheets" from glass fibers having mean fiber diameters of about 0.7 microns and prepared from the various test glass compositions being evaluated. These handsheets are a surrogate for actual commercially prepared specialty papers. Specimens for tensile testing are cut from the hand sheets and tested for tensile strength as a function of exposure time under controlled humidity conditions. Both straight tensile strength and folded tensile strength tests are typically made, the latter being used to simulate the pleating operation in filter manufacture. The size and amount, as well as the nature, of the "acid bonds" formed during the wet white water process determines the tensile strength of the fiberglass paper sheets produced on the specialty paper-making equipment. It is desirable that a tacky hydrosilica gel layer be formed at the fiber surface during the wet white water process as a result of the weak acid attack, by a typically pH2.0–pH3.0 $H_2SO_4$ solution. At the fiber junctions, such hydrosilica gel layers promote the formulation of desirable bonding between glass fibers to give the handsheets or papers good mechanical strength.

Straight tensile strength (zero humidity exposure) should correlate well with the level of ions leached from the fibers by the acid white water. If the fibers release too small an amount of ions, the bonding between fibers is weak and initial tensile strength is too low. If the fibers are too severely attacked, the fibers are weakened and easily broken, with resulting handsheet tensile strength again too low. Therefore, acceptable HEPA glass compositions can be characterized by an optimum level of fiber attack by the acid white water, as determined by hand sheet testing results.

The following lab test was developed to simulate the dissolution that glass fibers experience in the paper-maker's white water: 0.2 gram of fibers are exposed to 100 ml of pH 2.50 sulfuric acid solution for an hour at room temperature. The resulting solution is analyzed by Inductively Coupled Plasma "ICP", and the dissolved ions are reported in parts per billion (ppb). After measuring the fiber diameter distribution of the fibers and calculating their surface area per gram, or alternatively measuring the surface area by the BET method (a widely used and known method of measuring surface area), the acid dissolution results for various fiber compositions can be compared by normalizing to a common surface area. A normalized surface area of 2.5 $m^2/g$ was used. Experimental glass formulations may be compared to the results obtained for a conventional glass as part of making a judgment about their suitability for HEPA filtration media.

After exposure to the acidic paper-making conditions, the resulting fiberglass papers must withstand atmospheric humidity during filter manufacture and while in subsequent service as filtration media. A number of approaches have been used to evaluate resistance of a glass fiber to wet environments. One commonly used criterion is a water durability test where the weight loss of the fiber is determined when exposed to water at 205° F. (96° C.) for 24 hours. Another test sometimes used involves the evaluation of the loss in strength of a fiber as a function of aging time in a humid environment. This result can be characterized by measuring the decrease in tensile strength as a function of humidity exposure time (referred to as "humid aging"). In the humidity aging test, handsheet papers were made from glass fibers with average diameter of 0.65 micron. The handsheet samples were then aged in the humidity chamber at 95° F. and 90% relative humidity. Tensile tests were performed on samples after aging for different time periods to determine the performance of these fibers. Tensile tests are consisted of tests on both the straight and folded samples. The glass fiber media of the present invention have initial straight and folded tensile strength above 4 lbs/in and 2 lbs/in, respectively, and less than 50% loss of tensile strength after one week's aging. A humidity aging test is preferred because it better represents the commercially important conditions.

The glass compositions of the present invention have properties that allow them to be fiberized by conventional flame-attenuation processes known in the glass-making art. Such processes are preferred, as discussed above, particularly for filter applications because they produce the fine diameter glass fibers required for HEPA air filtration. In some cases, however, the slightly coarser fibers often used in combination with the fine fibers in some air filters are produced by conventional rotary fiberization technologies. Therefore, the preferred glass compositions of the present invention can be used in both processes. Specifically, the glasses of the present invention have a viscosity that is sufficiently low at fiberization temperatures to realize reasonable fiberization rates and efficiencies in flame attenuation processes and to avoid the use of expensive precious metal alloys (typically Pt—Rh alloy) as the bushing, pot or spinner material.

The preferred fibers for the HEPA filter media of the present invention are flame attenuated fibers. These fibers are formed by drawing continuous primary glass filaments from a bushing, rod, or pot and introducing these continuous primary glass filaments into the high energy gaseous blast of a flame attenuation burner, such as a Selas burner, where the continuous filaments are reheated, attenuated and formed into fine diameter staple or finite length glass fibers of the desired diameter, as described in general previously.

The glasses of the present invention preferably have an HTV less than 2200° F., and ideally less than 2025° F. in order to be suitable for flame attenuation. Glasses with HTV values of greater than 2200° F. are generally processed inefficiently in flame attenuation processes at low production rates with the use of Pt—Rh alloy as busing materials.

Preferred glass compositions have a liquidus temperature that is at least 250° F. below the HTV, most preferably from 250° F. to 300° F. below the HTV, in order to avoid devitrification (crystallization) problems during non-rotary, pot and marble or other flame attenuation fiberization processes.

Having generally described this invention, a further understanding can be obtained by reference to certain specific examples which are provided herein for purposes of illustration only and are not intended to be limiting unless otherwise specified.

In the following examples, the following procedures were used in testing the handsheet products prepared:

Tensile Handsheet Preparation

Ingredients: 0.5 Grams Fiber 500 ml DI Water 5 ml 1.8N Sulfuric Acid

Measure ingredients listed above and blend in a blender for 30 seconds at the low setting and then 90 seconds at the high setting.

Prepare a standard 8"×8" handsheet mold with a 100 mesh screen and add approximately 50 mls 1.8N Sulfuric acid to DI water as mold fills. Target pH for the mold is between 2 and 2.2 and should be adjusted accordingly.

Add blended slurry, agitate with handsheet mold agitator 2 to 3 times, drain and vacuum off excess water. Place handsheet into oven at 100–150° C. until about half dry. Transfer the sheet to another screen to complete drying. Completely drying a handsheet on the screen which it was formed will result in the sheet adhering to the screen.

Use a strip cutting device to cut off approximately 0.25" from each edge. Cut the remaining sample into 7 equal strips of 1" width.

Test strips using 0.5"/minute with a 4" gage length. Record peak load in lbs/in and percent elongation.

For double-folded tensile tests, bend strip 180° around a ³⁄₁₆" diameter rod, remove rod and gently place a 2000 gram weight along the fold. Remove the weight, bend the strip 180° on the opposite side of the sheet and again gently place the weight along the fold. Unfold the strip and place in the testing jaws for testing.

Humid Aging Study

Prepare 15 tensile handsheets for each sample to be included in the study. It is best to include a sample of standard product, with a similar fiber diameter to the samples being tested, as the "control" sample.

Cut each handsheet into 7 tensile strips of equal length and 1" wide. Strips should be of equal length so strip weight can be used to identify outlier samples caused by uneven handsheet formation. This should result in 105 test strips per sample.

Each of the 105 test strips is numbered for identification and weighed. A designation is included for each sample so samples can be differentiated.

The strips are weighed, the values are computer collected. At this point any "outlier" strips, determined by strip weight, are removed and replaced by one of the extra five strips. Only 100 of the 105 strips are needed for the study. By randomly placing test strips into the various categories, no bias should be caused by individual handsheet formation. All categories should result with 10 strips with equal average weights and standard deviations.

Sort test strips into categories and load into the humidity chamber. Load samples such that the next sets to be tested will be on the top of the chamber for easier access. Do not load 0-hour condition samples as they are tested without any heat and humidity treatment. All subsequent sample sets are compared to the 0-hour sets and checked for degeneration in tensile results caused from humid aging. The test chamber is set to 95° F. and 90% relative humidity.

Samples for both straight and folded tensile are tested after 6-hours, 24-hours, 72-hours, and 168-hours of treatment.

T-tests analyses are used to determine significant differences in sample set data, and samples of each data set averaged.

EXAMPLE 1

A fiber with the following composition (in mole %) was made using a pot and marble method, and the fiber tested.

| | |
|---|---|
| $SiO_2$ | 65.7 |
| $ZrO_2$ | <0.1 |
| $Al_2O_3$ | 1.3 |
| $B_2O_3$ | 10.7 |
| CaO | 2.2 |
| MgO | 2.0 |
| BaO | 2.1 |
| ZnO | 3.4 |
| $Na_2O$ | 9.6 |
| $K_2O$ | 2.9 |
| $F_2$ | <0.1 |

The foregoing glass composition was formed into ultrafine fibers using a flame attenuation process in a simulated production unit. In the process, molten glass was first fed through multiple orifices in the bottom of a large containment pot to form a series of fine streams called primaries. These primaries were then attenuated further by impingement of high velocity hot gas jets that draw them out with attenuation ratios that can be greater than 1000:1. This process also breaks the drawn filaments transversely forming a series of discrete, discontinuous fibers of desired length. These secondary ultrafine diameter fibers are then collected as a self-entangled web on a moving chain to form a felt or wool product.

The fibers were first evaluated by BET methods both before and after humid aging to determine loss in fiber strength. The fibers were also made into handsheets as described in the Tensile Handsheet Preparation, and tested accordingly. The results of the tests, and characteristics of the fibers, are shown below.

HTV: 1969° F. (1076° C.)

Liquidus: 1400° F. (760° C.)

Surface tension @900° C.: 297 dyne/cm

Change in BET surface area after humid aging: <+0.5%

$k_{dis}$ in ultrafine fiber form: 141 leach rate in simulated acid whitewater: 0.33 $\mu g/cm^2$ hr average initial handsheet tensile strength (1 $\mu$m mean diameter fiber): 2.2 lbs./in.

average folded handsheet tensile strength (1 $\mu$m mean diameter fiber): 0.85 lbs/in.

t ½ for loss in straight tensile strength upon humid aging: >2000 hrs. (no significant change)

t ½ for loss in folded tensile strength upon humid aging: 665 hrs.

average initial handsheet elongation (1 $\mu$m mean diameter fiber): 0.35% average folded handsheet elongation (1 $\mu$m mean diameter fiber): 0.56% t ½ for loss in elongation upon humid aging: 446 hrs. (<5%)

t ½ for loss in elongation in folded samples upon humid aging: 488 hrs. (appr. 18%) 0.42 $\mu g/cm_2$ hr

EXAMPLE 2

A fiber with the following composition (in mole %) was made using a pot and marble procedure, and tested as described in Example 1. The results of the tests are shown below.

| | |
|---|---|
| $SiO_2$ | 64.1 |
| $ZrO_2$ | 2.0 |
| $Al_2O_3$ | 0.4 |
| $B_2O_3$ | 10.7 |
| CaO | 1.8 |
| MgO | 0.6 |
| BaO | 2.1 |
| ZnO | 4.0 |
| $Na_2O$ | 13.0 |
| $K_2O$ | 0.1 |
| $F_2$ | 1.1 |

HTV: 1928° F. (1053° C.)

Liquidus: 1578° F. (859° C.)

Surface tension @900° C.: 300 dyne/cm

Change in BET surface area after humid aging: +2.4%

$k_{dis}$ in ultrafine fiber form: 114 leach rate in simulated acid whitewater: 0.42 $\mu g/cm^2$ hr average initial handsheet tensile strength (1 $\mu$m mean diameter fiber): 1.85 lbs./in.

average folded handsheet tensile strength (1 $\mu$m mean diameter fiber): 0.95 lbs/in.

t ½ for loss in straight tensile strength upon humid aging: >2000 hrs. (no significant change)

t ½ for loss in folded tensile strength upon humid aging: 280 hrs.

average initial handsheet elongation (1 μm mean diameter fiber): 0.6% average folded handsheet elongation (1 μm mean diameter fiber): 0.6% t ½ for loss in elongation upon humid aging: >2000 hrs. (no significant change)

t ½ for loss in elongation in folded samples upon humid aging: 659 hrs. (appr. 11%)

EXAMPLE 3

Fibers made in a full scale production unit demonstrate performance properties that are desirable in a commercial product. For verification, ultrafine fibers made in such a unit in accordance with Example 1 from the glass composition disclosed in Example 1 were tested alongside fibers of comparable diameter and length that have been in commercial production for over 40 years (with good performance). The latter commercial fibers are made from a glass that does not provide the desired rates of biodegradation claimed above. Specifically, fibers from this glass exhibit in vitro dissolution rates in simulated physiological saline of only about 20 ng/cm² hr (less than the 100 ng/cm² hr value required). The composition of the commercial fibers was as follows:

| | |
|---|---|
| $SiO_2$ | 63.5 |
| $Al_2O_3$ | 3.8 |
| CaO | 2.2 |
| MgO | 0.4 |
| BaO | 2.1 |
| ZnO | 3.2 |
| $Na_2O$ | 10.7 |
| $K_2O$ | 2.3 |
| $B_2O_3$ | 10.4 |
| $F_2$ | 1.3 |

These two sets of fibers were first evaluated by BET methods both before and after humid aging to determine loss in fiber strength. The change in BET surface area after aging ranged from a minimum of 0 to a maximum of +2.1% in a series of tests run on fiber made from the glass composition disclosed in Example 1 (+values indicate an increase in surface area). The corresponding range for the commercial production fibers was +0.4 to +1.5%. Both fibers showed increases well below the +10% limit required for satisfactory performance; differences in the results between the two were statistically insignificant.

Fibers were also made into handsheets as described previously. Ultrafine fibers made from both the glass composition of Example 1 and from the commercial production glass used in these tests had mean diameters of 0.65 μm and mean lengths of about 1 mm. In these tests, the commercial production fibers were again used as a control group since it is known from many years of commercial use that their strength degradation over time is acceptable for the wide range of applications in which they are used. Both of these fiber samples were of a significantly finer diameter than those treated previously and were thereby more sensitive to effects of humid aging; their diameters were also more representative of the majority of fibers currently used commercially. Tensile data was obtained from both unfolded and doubly folded handsheets (termed "straight" and "folded" tensile values, respectively). Data were obtained both before and after humid aging. The specific methods and conditions used are those described previously.

Results of the handsheet tests showed that sheets made from fibers of the present invention showed no significant loss in either straight or folded tensile strength after 24 hours exposure to hot humid air. This was also the case for sheets made from the commercial production fibers. Loss in both straight and folded tensile values did occur for both sets of handsheets after 24 hours, as expected. After 168 hours exposure, straight tensile values for sheets made from fibers from the present composition showed an average loss of 10.3% (9.7% standard deviation); corresponding losses in folded tensile strength averaged 47.8% (8.1% standard deviation). This was also expected as the double folded tensile test is far more severe than the unfolded test. In comparison, results from sheets made from the commercial production fiber showed an average 16.1% loss in straight tensile strength (14.4% standard deviation) and an average 45.8% loss in folded tensile strength (8.0% standard deviation). As such, the aging performance of sheets made from fibers from the present composition and those from commercial production fibers is indistinguishable, in regard to loss in both straight and folded tensile strength.

Melting and fiberization of the glass of Example 1 in a full scale commercial system also showed that it meets all of the requirements necessary for continuous production, which criteria were outlined previously. Comparisons were made to the performance of the commercial production glass noted above. It was specifically noted that (1) the present glass of Example 1 was able to be easily fiberized as described above achieving both the desired range of fiber diameters and fiber lengths, (2) the glass of Example 1 did not crystallize or devitrify anywhere within the system, (3) the glass of Example 1 did not attack or corrode any of the metal parts or refractories, and (4) the newly disclosed glass did not produce excessive volatilization and, consequently, no problems with dust or high emissions were noted. It is concluded that this glass is capable of meeting all of the production and performance requirements exhibited by the commercial standard production glass, but has a very significant advantage in it's high rate of dissolution in biologically relevant systems.

Having now fully described the invention, it will be apparent to one of ordinary skill in the art that many changes and modifications can be made thereto without departing from the spirit or scope of the invention as set forth herein.

What is claimed is:

1. A glass composition comprising the following by mole percent:

| | |
|---|---|
| 62 to 68% | $SiO_2$ |
| 0.1 to 2% | $Al_2O_3$ |
| 8 to 14% | $Na_2O$ |
| 0 to 3.5% | $K_2O$ |
| 7 to 12% | $B_2O_3$ |
| 1.5 to 3.5% | CaO |
| 0 to 3.5% | MgO |
| 0 to 3% | BaO |
| 2 to 5% | ZnO |
| 0 to 3% | $ZrO_2$ |
| 0 to 1.5 | $F_2$ | with the glass composition having an HTV of between about 1850° F. and 2200° F.

2. A glass composition according to claim 1 having an HTV of less than 2025° F.

3. A glass composition according to claim 1 having a liquidus temperature of at least 250° F. below said HTV.

4. A glass composition according to claim 1 having a liquidus temperature of at least 350° F. below said HTV.

5. A glass composition according to claim 1 having acid white water resistance sufficient to lose less than 18,000 ppb total ions when dissolved in pH 2.5 sulfuric acid solution for an hour at room temperature.

6. The glass composition of claim 1, comprising the following by mole percent:

| | |
|---|---|
| 64 to 66% | $SiO_2$ |
| 0.4 to 1.5% | $Al_2O_3$ |
| 10 to 12% | $B_2O_3$ |
| 3.0 to 4.5% | ZnO |
| 1.5 to 2.5% | CaO |
| 0.5 to 2.5% | MgO |
| 2.0 to 2.5% | BaO |
| 9 to 13% | $Na_2O$ |
| 0.1 to 3% | $K_2O$ |
| 0.05 to 2% | $ZrO_2$ |
| 0 to 1.5% | $F_2$. |

7. Glass fibers prepared from the glass composition of claim 1, wherein the ($k_{dis}$) is greater than 100 ng/cm² hr.

8. The glass fibers of claim 7, wherein the ($k_{dis}$) is greater than 130 ng/cm² hr.

9. Glass fibers prepared from the glass composition of claim 6, wherein the ($k_{dis}$) is greater than 100 ng/cm² hr.

10. The glass fibers of claim 9, wherein the ($k_{dis}$) is greater than 130 ng/cm² hr.

11. A filtration medium comprising glass fibers prepared from the glass composition of claim 1.

12. A filtration medium comprising glass fibers prepared from the glass composition of claim 6.

13. A filtration medium comprising the glass fibers of claim 7.

14. A filtration medium comprising the glass fibers of claim 9.

15. A filter product comprising the medium of claim 11.

16. A filter product comprising the medium of claim 12.

17. A filter product comprising the medium of claim 13.

18. A filter product comprising the medium of claim 14.

19. The filter product of claim 15, wherein the filter product is a HEPA air filtration product.

20. A method for preparing glass fibers, which comprises contacting primaries with sufficient high temperature to create a loss of the more valuable compounds of the glass composition from the outside of the primaries to thereby create an outer shell which has a different composition than the fiber interior, where the primaries are prepared from the glass composition of claim 1, and where the glass fibers exhibit a biodissolution in excess of 100 ng/cm²/hr.

21. The method of claim 20, wherein a pot and marble technique is employed to prepare the glass fibers.

22. The method of claim 20, wherein a direct melt method is employed to prepare the glass fibers.

23. A filtration medium comprising glass fibers prepared from a glass composition comprising the following by mole percent:

| | |
|---|---|
| 62 to 68% | $SiO_2$ |
| 0.1 to 2% | $Al_2O_3$ |
| 8 to 14% | $Na_2O$ |
| 0 to 3.5% | $K_2O$ |
| 7 to 12% | $B_2O_3$ |
| 1.5 to 3.5% | CaO |
| 0 to 3.5% | MgO |
| 0 to 3% | BaO |
| 2 to 5% | ZnO |
| 0 to 3% | $ZrO_2$ |
| 0 to 1.5 | $F_2$ | wherein the ($k_{dis}$) of the fibers is greater than 100 ng/cm² hr.

24. The filtration medium of claim 23, wherein the ($k_{dis}$) of the fibers is greater than 130 cm² hr.

25. The filtration medium of claim 23, wherein the glass fibers are prepared from a glass composition comprising the following by mole percent:

| | |
|---|---|
| 64 to 66% | $SiO_2$ |
| 0.4 to 1.5% | $Al_2O_3$ |
| 10 to 12% | $B_2O_3$ |
| 3.0 to 4.5% | ZnO |
| 1.5 to 2.5% | CaO |
| 0.5 to 2.5% | MgO |
| 2.0 to 2.5% | BaO |
| 9 to 13% | $Na_2O$ |
| 0.1 to 3% | $K_2O$ |
| 0.05 to 2% | $ZrO_2$ |
| 0 to 1.5% | $F_2$. |

26. The filtration medium of claim 25, wherein the ($k_{dis}$) of the fibers is greater than 130 ng/cm² hr.

27. A filter product comprising the medium of claim 23.

28. A filter product comprising the medium of claim 24.

29. A filter product comprising the medium of claim 25.

30. A filter product comprising the medium of claim 26.

31. The filter product of claim 27, wherein the filter product is a HEPA air filtration product.

* * * * *